No. 869,802. PATENTED OCT. 29, 1907.
A. S. PEARCE.
WRENCH.
APPLICATION FILED SEPT. 19, 1906.

WITNESSES
J. A. Brophy
John K. Brachupel

INVENTOR
Arthur S. Pearce
BY Munn & Co
ATTORNEYS

UNITED STATES PATENT OFFICE.

ARTHUR STARR PEARCE, OF SAN JUAN, CALIFORNIA.

WRENCH.

No. 869,802.        Specification of Letters Patent.        Patented Oct. 29, 1907.

Application filed September 19, 1906. Serial No. 335,252.

*To all whom it may concern:*

Be it known that I, ARTHUR STARR PEARCE, a citizen of the United States, and a resident of San Juan, in the county of San Benito and State of California, have invented a new and Improved Wrench, of which the following is a full, clear, and exact description.

This invention relates to wrenches, and is particularly useful in connection with devices of this character for removing nuts from vehicle axles, to permit the removal of the wheel.

The object of the invention is to provide a wrench, simple, strong and durable in construction, by means of which a nut may be easily removed from a vehicle axle and which can be operated by the turning of the wheel which is secured upon the axle by the nut.

A further object of the invention is to provide a wrench adapted to grip a nut and at the same time to engage with the wheel-hub so that the nut is unscrewed by turning the wheel in one direction, and may be screwed back upon the axle by turning in the opposite direction.

The invention consists in the construction and combination of parts to be more fully described hereinafter, and particularly set forth in the claims.

Figure 1:
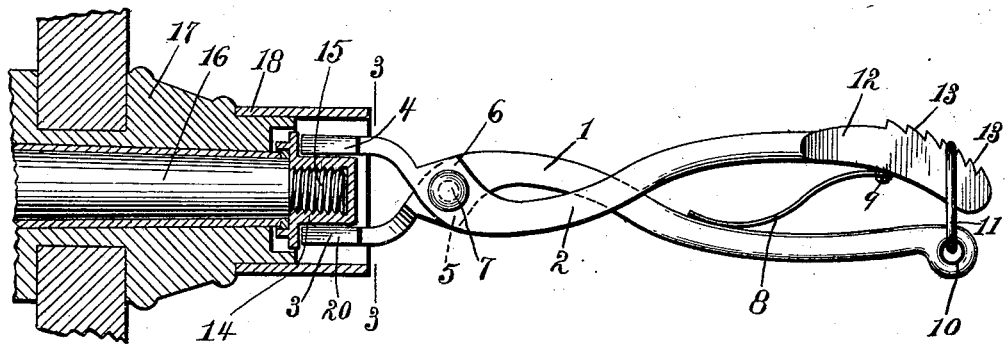
Figure 2:
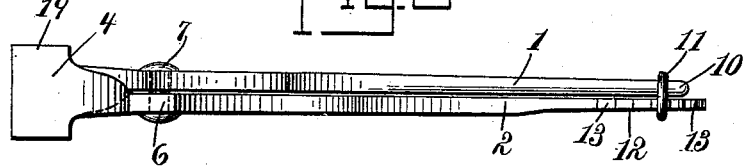
Figure 3:
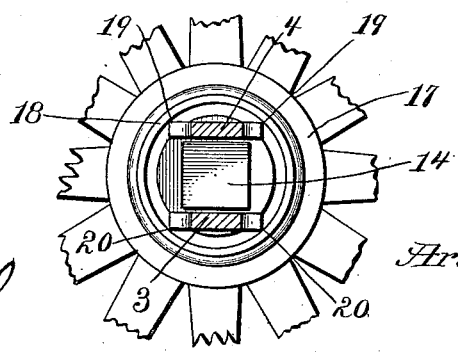

Reference is to be had to the accompanying drawings forming a part of this specification in which similar characters of reference indicate corresponding parts in all the figures, and in which Figure 1 is a cross section of the outer end of a wheel-hub with my invention in position to unscrew the nut from the axle; Fig. 2 is a top plan view of the device; and Fig. 3 is a vertical section on the line 3—3 of Fig. 1.

Referring more particularly to the drawings, I provide arms 1 and 2 terminating in flattened jaws 3 and 4 respectively. The jaws are offset to one side of each of the arms 1 and 2, in order that they may register closely when the arms are pivotally joined side by side as appears most clearly in Fig. 2. Adjacent to the jaws, the arms have widened portions 5 and 6 provided with suitable openings through which a rivet pin 7 may be passed to form a pivotal connection between the arms. At this pivotal connection the arms are crossed and they are also crossed on that side of the rivet pin 7 which is remote from the jaws. Between the crossed ends of the arms remote from the jaws is a spring 8 secured to one of the arms by means of a screw or pin 9 which is adapted normally to force the arms apart, thereby correspondingly forcing the jaws together because of the double crossing of the arms, as will be understood from Fig. 1. The end of the arm 1 remote from the jaw 4 is formed with an integral eye 10 in which is located, free to move, a link 11; the corresponding end of the arm 2 has a flattened portion 12 the upper edge of which is provided with a number of teeth 13 adapted to engage with the link 11 to hold the arms together as shown most clearly in Fig. 1.

To use the device, the arms are forced together to open the jaws, and these are then placed adjacent to the opposite faces of an axle-nut 14 which is screwed upon the threaded end 15 of an axle 16. The hub 17 which is mounted upon the axle 16 and is held thereupon by means of the nut 14 has at its outer extremity a metal band or hub-ring 18 projecting beyond the hub and the nut and forming a protecting sleeve for the latter. The jaws 3 and 4 have lateral edges 19 adapted to engage with the inner face of the hub-ring 18. After the jaws of the wrench are inserted between the hub-ring and the nut they are opened by pressing the arms together, and are then locked in position by means of the link 11 and the teeth 13. The tension of the spring 8 tends to keep the arms apart and thereby to spread the jaws. It will be understood that when the arms are forced together the edges 19 of the jaws come into engagement with the inner face of the hub-ring, but the space between the hub-ring and the nut is usually so inconsiderable that the jaws will at the same time still be capable of gripping the nut. When the wrench is fixed within the hub the wheel is turned, turning with it the wrench, through the engagement of the jaws of the latter with the hub-ring, and the wrench in turn unscrews the nut from the axle. When the nut is unscrewed the wheel may be slipped from the axle and placed upon the ground, the end of the wrench also resting upon the latter. When it is desired to replace the wheel upon the axle, it is merely necessary to slip the wheel upon the latter and turn it in the reverse direction, thereby screwing the nut upon the end of the axle. By the use of this device it is unnecessary to remove the nut from the hub with the consequent possibility of losing the nut or dropping it in the dirt, and thereby obviating as well, the possibility of dirtying the hands by contact with the axle grease. In this way also, is avoided the danger of losing the washers, for the nut is not removed from the hub.

Having thus described my invention I claim as new and desire to secure by Letters Patent:

1. A wrench having arms provided with jaws adapted to engage with the inner side of a hub-ring and having a pivotal connection, said arms being crossed at said connection and on the side of said connection remote from said jaws, means for holding said arms in a plurality of positions, and means between said arms for forcing the same apart at the side of said pivotal connection remote from said jaws.

2. A wrench having crossed arms terminating in jaws adapted to grip a nut, and having a pivotal connection at the crossing of said arms, said jaws being further adapted to engage with the inner face of a hub ring to grip the same, said arms being further crossed at the side of said pivotal connection remote from said jaws, one of said arms having a link at an extremity, the other of said arms having recesses adapted to engage with said link, and means between said arms adapted to force the same apart.

3. A wrench having arms provided with jaws adapted to engage with the inner side of a hub-ring and having a pivotal connection, said arms being crossed at said connection and on the side of said connection remote from said jaws, means for holding said arms in a plurality of positions, and a spring between said arms adapted to force the same apart.

4. A wrench having crossed arms terminating in flattened jaws adapted to grip a nut and having a pivotal connection at the crossing of said arms, said jaws having edges adapted to engage with the inner face of a hub-ring, said arms being further crossed at the side of said pivotal connection remote from said jaws, one of said arms having a link at an extremity, the other of said arms having recesses adapted to engage with said link, and a spring between said arms adapted to force the same apart.

5. A wrench having crossed arms terminating in flattened jaws adapted to grip a nut and having a pivotal connection at the crossing of said arms, said jaws having edges adapted to engage with the inner side of a hub-ring, said jaws further being laterally disposed on said arms, said arms being crossed on the side of said pivotal connection remote from said jaws, one of said arms having an eye at the end thereof and a link loosely mounted in said eye, the other arm having an end disposed toward said first arm and provided with a plurality of teeth adapted to engage with said link, and a spring secured to one of said arms and adapted to press against the other of said arms to force said arms apart.

In testimony whereof I have signed my name to this specification in the presence of two subscribing witnesses.

ARTHUR STARR PEARCE.

Witnesses:
 FRANK E. BREEN,
 W. R. MOORE.